Figure 1:
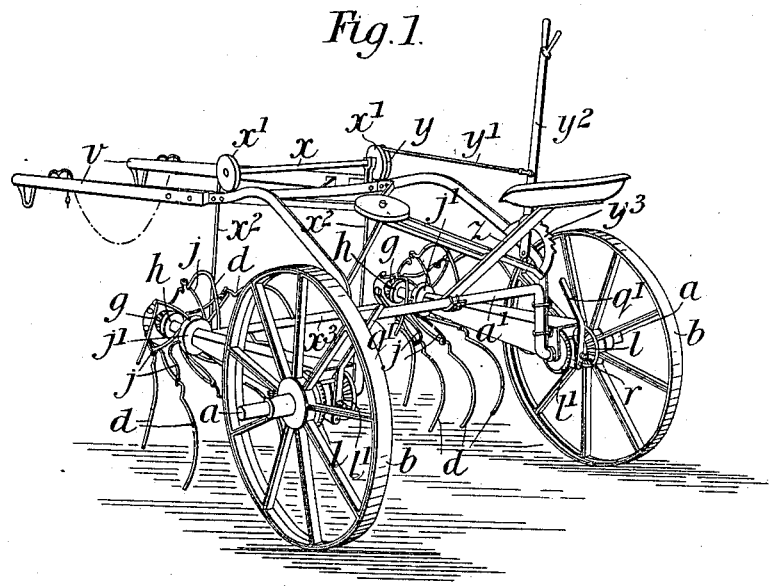

No. 831,032.

PATENTED SEPT. 18, 1906.

E. C. BLACKSTONE & R. E. WATTS.
SWATH TURNER.
APPLICATION FILED OCT. 17, 1904.

3 SHEETS—SHEET 1.

Witnesses

Inventors

No. 831,032. PATENTED SEPT. 18, 1906.
E. C. BLACKSTONE & R. E. WATTS.
SWATH TURNER.
APPLICATION FILED OCT. 17, 1904.
3 SHEETS—SHEET 3.
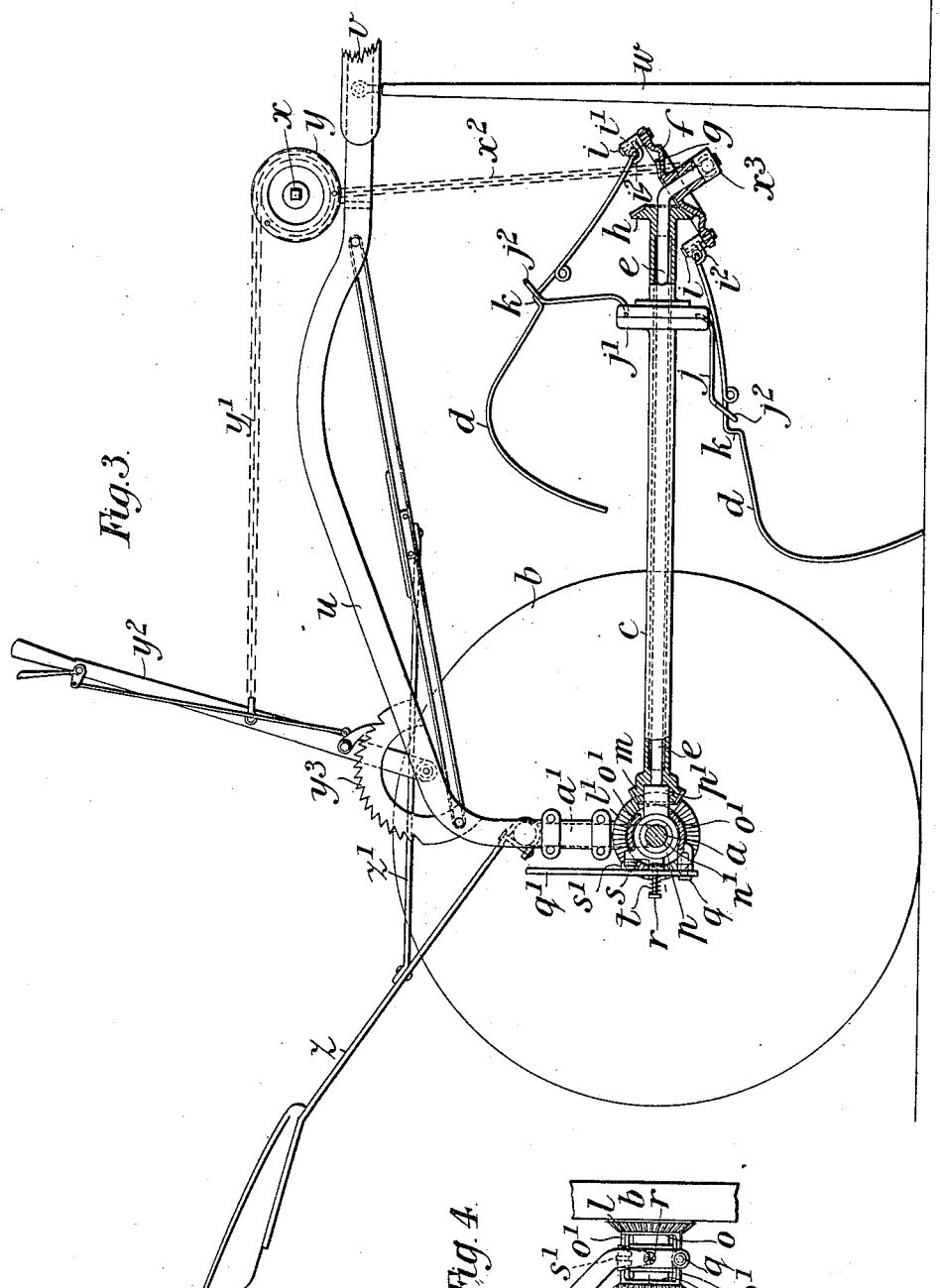
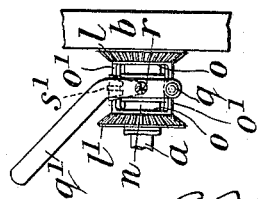
Witnesses
John E. Bousfield.
C. G. Reagan
Inventors.
E. C. Blackstone
R. E. Watts.

UNITED STATES PATENT OFFICE.

EDWARD CHRISTOPHER BLACKSTONE AND RICHARD EDWARD WATTS, OF STAMFORD, ENGLAND.

SWATH-TURNER.

No. 831,032.      Specification of Letters Patent.      Patented Sept. 18, 1906.

Application filed October 17, 1904. Serial No. 228,818.

*To all whom it may concern:*

Be it known that we, EDWARD CHRISTOPHER BLACKSTONE and RICHARD EDWARD WATTS, subjects of the King of Great Britain, residing at Rutland Engineering Works, Stamford, Lincolnshire, England, have invented new and useful Improvements in Swath-Turners, of which the following is a specification.

Our invention relates to an improved swath-turner wherein a series of single tines or forks is pivoted around a common axis and so arranged that each tine or fork is individually free to follow the inequalities of the ground and in turning the swath to remain in contact with the ground for a sufficient length of time to insure the turning.

According to the invention the tines or forks are each at one end mounted in a bearing loosely carried in a disk arranged in a horizontal or more or less inclined position, and at a point intermediate of their two ends the said tines are connected by means of link-bars with a vertical disk on a shaft which is more or less horizontal and which, for convenience, we hereinafter refer to as a "lay-shaft," the said lay-shaft being provided with gearing for transmitting motion to the horizontal or inclined disk, so that both disks move at a uniform speed. With this arrangement the tines revolve around the lay-shaft, the links serving to drive, lift, and guide the tines over the gearing by means of which they are operated. The arrangement, furthermore, has the effect of always maintaining the operative ends of the tines or forks in a vertical or substantially vertical plane, so that there will never be any liability of the said tines, as they are lifted from the ground, carrying up with them any of the crop upon which they are operating.

In order that the tines may remain in contact with the ground during the turning of the swath, a sliding connection is provided between the link-bars and the tines, whereby sufficient freedom of movement is given to the said tines to allow them to drop during a certain part of their movement under their own weight, collars or stops upon the said tines limiting the movement so that they will ultimately be compelled to rise and pass over the horizontal shaft before they again come into contact with the ground. It will be understood that any suitable number of tines may be connected to the disks.

To enable our invention to be fully understood, we will describe the same by reference to the accompanying drawings, in which—

Figure 2:
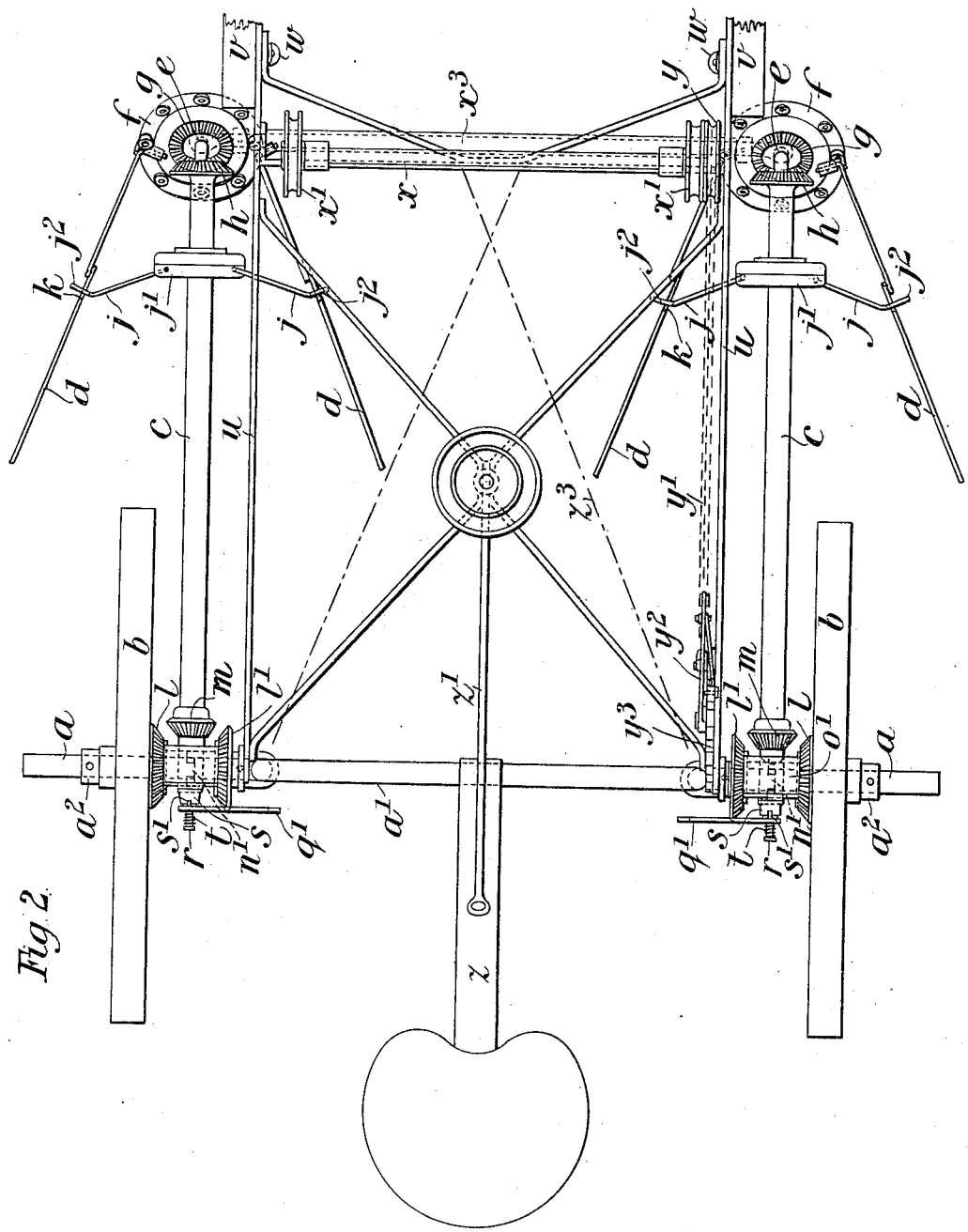

Figure 1 is a perspective view of a machine constructed according to our invention and provided with two sets or heads of tines. Fig. 2 is a plan of the machine. Fig. 3 is a sectional side elevation of the same, and Fig. 4 is an elevation of a detail.

$a$ is the axle of the machine, and $b\ b$ are the traveling wheels mounted thereon, the said axle being cranked upward between the traveling wheels at $a'$ in order to afford clearance between the axle and the crop.

$c\ c$ are lay-shafts, and $d\ d$ are the tines, a series of which is arranged in conjunction with each lay-shaft $c$, although in the drawings only two are shown in connection with each shaft.

As the arrangement and operation of the two lay-shafts and the corresponding sets of tines or tine-heads is identical, we will only describe one set in detail. The lay-shaft $c$ is mounted upon a spindle $e$, which at one end is carried upon the main axle $a$, as hereinafter described, and at the other end is cranked and carries the inclined disk $f$, which, as shown, has formed integral with it a series of bevel-teeth $g$, with which a bevel-pinion $h$ on the end of the lay-shaft $c$ engages. The disk $f$ is provided with a series of pins $i\ i$, parallel with the axis of rotation of the said disk, and upon these pins are mounted sockets $i'\ i'$, which are free to rotate upon the said pins and in which the teeth $d$ are also pivotally carried, the axes of movement of the said teeth being at right angles to the axes of the pins $i\ i$. By mounting the teeth $d$ in this manner, it will be understood that they are free to take any position relatively with the disk $f$. The pivot-pins of the teeth are prevented from coming out of the sockets $i'\ i'$, (except when the latter are removed from the pins $i\ i$,) by projections $i^2\ i^2$.

The position of the tines $d\ d$ is controlled by the links $j\ j$ upon the disk $j'$ secured to the lay-shaft $c$. These links $j\ j$ are provided at the outer ends with eyes $j^2$, through which the tines $d\ d$ are passed, and at their inner ends are pivoted to the disk $j'$, but in such a manner that while they are free to approach toward and recede from the lay-shaft they are always maintained in a radial position relatively with the disk $j'$.

With the arrangement hereinbefore described it will be understood that as the lay-shaft $c$ is rotated, together with the disks $f$ and $j'$, the tines will revolve around the lay-shaft, each tine as it touches the ground being free to rise and fall to adapt itself to inequalities and also remaining in contact with the ground during a considerable arc of movement, and thereby remaining in contact with the crop for sufficient time to give it a positive sweep. As the rotation continues, the tines are gradually moved more or less in a longitudinal direction, owing to the arrangement of their pivots upon the disk $f$, and at the same time, owing to the arrangement of hooks $k$ in the tines, the links $j\ j$ are caused to swing away from the lay-shaft, so that each tine as it reaches its uppermost position (shown in Fig. 3) is lifted clear of the lay-shaft and passes over the same in a manner which will be readily understood. The fact that the links $j\ j$ are not able to move radially relatively with the disk $j'$ insures the proper travel of the tines when upon the ground and in other positions.

As hereinbefore stated, the machine shown in the drawings is provided with two sets of tines. In order to provide for rotating the sesets of tines in either direction, we advantageously make use of the following arrangement—that is to say, in connection with each traveling wheel $b$ and for each lay-shaft we provide a pair of gear-wheels $l\ l'$, which are mounted upon the axle $a$ and connected with the traveling wheel $b$, so as to rotate therewith, and upon the end of the lay-shaft is a bevel-pinion $m$, adapted to be engaged with either the wheel $l$ or the wheel $l'$, according to the direction in which the lay-shaft is to rotate. The wheels $l\ l'$ are made separate from each other and are provided on the adjacent sides with elongated bosses, which together form a sleeve $n$, Fig. 4, upon the axle between the two wheels and which at the ends are provided with interlocking teeth, as at $n'$, Figs. 2 and 3, for causing the two wheels to run together. This arrangement also allows of a straddle-piece, consisting of two rings $o\ o$, connected by bridge-pieces $o'\ o'$, being placed between the wheels $l\ l'$ upon the sleeve, and also of a bush $p$, being placed upon the sleeve between the rings of the straddle-piece, the said bush being provided with a socket $p'$, which carries the end of the spindle $e$, upon which the lay-shaft $c$ rotates. Upon the lower bridge $o'$ of the straddle-piece is secured a pivot-pin $q$, upon which a lever $q'$ is mounted, and upon the bush $p$ is a pin $r$, which also passes through the lever $q'$, whereby the movement of the said lever $q'$ will cause the bush $p$ to slide upon the sleeve $n$ in order to engage the bevel-pinion $m$ of the lay-shaft with either the wheel $l$ or the wheel $l'$, as may be desired.

To hold the lever so that the pinion is in engagement with one or other of the wheels $l$ $l'$ or in an intermediate position out of gear with either of the said wheels, we provide upon the bush $p$ a lug $s$, having in it a series of notches or recesses with which a lug $s'$ on the lever $q'$ is designed to engage, the positions of the notches or recesses corresponding with the several positions in which the lever is to be held. To allow of the engagement and disengagement of the lug $s'$ with and from the notches or recesses, the pin $r$, by means of which the lever is connected to the bush $p$, is provided with a spring $t$, as shown in Figs. 2 and 3, which will allow of the necessary backward movement of the said lever.

It is to be understood that the reversing-gear just described forms no part of our invention and that any other suitable form of gear may be made use of.

$u$ is a frame, the side irons of which are at one end clipped or bolted to the cranked part $a'$ of the axle $a$ and which at its front end has attached to it the draft-shafts $v\ v$.

$w$ is a prop two of which are advantageously used to support the front end of the frame when the implement is not in use and when the horse is being attached.

Upon the frame $u$ is mounted a shaft $x$, having upon it two drums $x'\ x'$, connected by chains $x^2\ x^2$ to a bar $x^3$, to which the cranked ends of the spindles $e\ e$, upon which the lay-shafts $c\ c$ rotate, are carried and which chains $x^2\ x^2$ thus serve to support the front ends of the lay-shafts with their tines. To raise or lower the lay-shafts relatively with the ground according to requirements, the shaft $x$ is provided with an additional drum $y$, to which is attached one end of a chain $y'$, the other end of which is connected to a lever $y^2$, in connection with a rack $y^3$. The movement of this lever $y^2$ serves, by rotating the shaft $x$, to wind or unwind the chains $x^2\ x^2$ onto or from the drums $x'$, and so raise and lower the lay-shafts in the desired manner.

$z$ is the driver's seat which is clipped upon the axle and supported from the frame $u$ by a tie-bar $z'$, the said seat projecting rearwardly from the axle to such an extent that the weight of the driver sitting upon the seat will more or less balance the front portion of the frame and the parts carried thereby. Instead of arranging the seat to extend rearwardly of the main axle and the lay-shafts to extend in front thereof the arrangement may be reversed—that is to say, the lay-shafts may project behind the main axle and the seat be in the front thereof.

It is to be understood that our invention is not limited to the details of construction hereinbefore described. For instance, the motion of the lay-shaft may be transmitted to the disk $f$ through the medium of a universal joint instead of through the medium of gearing, and in this case the said lay-shaft, instead of being tubular, may be made solid.

To allow of the distance between the lay-shafts being more or less regulated, the bar $x^3$, in which the forward ends of the spindles $e\ e$ upon the lay-shafts are carried, may be made telescopic, and the road-wheels $b\ b$, with their bevel-gearing, may also be adapted to be adjusted laterally on the axles by the adjustment of collars, as at $a^2\ a^2$, and set-pins.

Instead of constructing the machine with only two heads or sets of tines, as shown in the drawings, a machine may be constructed with three or more sets of tines, and these tines may be arranged in such relation to one another that the crop will be passed from one to the other in succession, in which case the implement will serve as a side-delivery rake.

In a heavy wind the machine can always be worked with the wind in its favor—i. e., blowing the crop off the fliers by turning it round at the end of the row and returning between the next two swaths with the fliers reversed, so that the crop is still turned from the butts.

When swath-turning, it is necessary to prevent the outer flier catching the swath that the inner one has turned. This is done by means of a light guard of sheet-iron or other material, the positions of which are indicated in Fig. 2 by the dotted lines $z^2\ z^2$ and $z^3\ z^3$, the former showing the position of the guard when the machine is following a right-hand mower and the latter when following a left. When collecting, this guard may be dispensed with.

Having now particularly described and ascertained the nature of our said invention and in what manner the same is to be performed, we declare that what we claim is—

1. In a swath-turner, the combination with a main frame, of an inclined disk revolubly mounted on said frame, a vertical disk revolubly mounted on said frame, tines pivoted to said inclined disk, links connecting said tines with said vertical disk and means for simultaneously operating said disks, substantially as described.

2. In a swath-turner, the combination with the main frame provided with a horizontal spindle having an inclined bearing portion, of a disk revolubly mounted on said inclined bearing portion, a lay-shaft on said spindle constructed to impart rotary motion to said inclined disk, a vertical disk mounted on said lay-shaft, tines pivoted to said inclined disk, links connecting said tines with said vertical disk and means for imparting motion to said lay-shaft, substantially as described.

3. In a swath-turner, the combination with the main frame provided with a horizontal spindle having an inclined bearing portion, of a disk revolubly mounted on said inclined bearing portion, a lay-shaft on said spindle constructed to impart rotary motion to said inclined disk, a vertical disk mounted on said lay-shaft, tines pivoted to said inclined disk, links connecting said tines with said vertical disk and means for imparting motion to said lay-shaft in either direction, substantially as described.

4. In a swath-turner, the combination with the main frame, of a spindle pivoted thereto, an inclined disk revolubly mounted on said spindle, a lay-shaft mounted on said spindle and constructed to impart motion to said inclined disk, a vertical disk mounted on said lay-shaft, tines pivoted to said inclined disk, links connecting said tines with said vertical disk, means for imparting motion to said lay-shaft and means for raising or lowering said spindle, substantially as described.

5. In a swath-turner, the combination with the main frame provided with a horizontal spindle having an inclined bearing portion, of a disk revolubly mounted on said inclined bearing portion, a lay-shaft revolubly mounted on said spindle and constructed to impart motion to said disk, a vertical disk mounted on said shaft, tines pivoted to said inclined disk so as to permit lateral and vertical movement thereof, links pivoted to said vertical disk and provided at their free ends with portions for loosely engaging said tines, said tines being constructed to permit a limited amount of play of said links thereon, and means for imparting motion to said lay-shaft, substantially as described.

6. In a swath-turner, the combination with the main frame, of a spindle having an axle-engaging portion whereby said spindle is permitted a lateral movement, an inclined disk revolubly mounted on said spindle, a lay-shaft on said spindle constructed to impart motion to said inclined disk, a vertical disk mounted on said lay-shaft, tines pivoted to said inclined disk, links connecting said tines with said vertical disk, oppositely-disposed beveled pinions rotated by the traveling wheel, a bevel-pinion on said lay-shaft and means for shifting said spindle to throw said pinion on said lay-shaft into engagement with either of said oppositely-disposed pinions whereby said lay-shaft may be rotated in either direction, substantially as described.

7. In a swath-turner, the combination with the main frame, of a spindle having an axle-engaging portion whereby said spindle is permitted both lateral and vertical movement, an inclined disk revolubly mounted on said spindle, a lay-shaft on said spindle constructed to impart motion to said inclined disk, a vertical disk mounted on said lay-shaft, tines pivoted to said inclined disk, links connecting said tines with said vertical disk, oppositely-disposed beveled pinions rotated by the traveling wheel, a bevel-pinion on said lay-shaft, means for shifting said spindle to throw said pinion on said lay-shaft into engagement with either of said oppositely-disposed pinions whereby said lay-shaft may be operated in either direction and means for raising and lowering said spindle, substantially as described.

8. In a swath-turner, the combination with the main frame, of a spindle pivoted thereto, an inclined disk revolubly mounted on said spindle, a lay-shaft mounted on said spindle and constructed to impart motion to said inclined disk, a vertical disk mounted on said lay-shaft, tines pivoted to said inclined disk, links connecting said tines with said vertical disk, means for operating said lay-shaft, a drum revolubly mounted on said frame, a chain connecting said drum with the free end of said spindle, and means for operating said drum whereby said spindle may be raised and lowered, substantially as described.

9. In a swath-turner, the combination with the main frame, of spindles pivoted thereto, an inclined disk revolubly mounted on each of said spindles, a lay-shaft mounted on each of said spindles, and constructed to impart motion to said inclined disk, a vertical disk mounted on each lay-shaft, tines pivoted to said inclined disk, links connecting said tines with said vertical disk, means for imparting motion to said lay-shafts and means for simultaneously raising or lowering said spindles, substantially as described.

10. In a swath-turner, the combination with the main frame, of spindles pivoted thereto, each of said spindles having an inclined bearing portion, a disk revolubly mounted on each of said inclined bearing portions, a lay-shaft mounted on each of said spindles and constructed to impart motion to said inclined disk, a vertical disk mounted on each lay-shaft, tines pivoted to said inclined disk, links connecting said tines with said vertical disk, means for imparting motion to said lay-shafts, a bar connecting said spindles, a transverse shaft revolubly mounted on said frame, drums mounted on said shaft, chains connecting said drums with said bar connecting said spindles, a lever pivoted to said frame and a drum on said shaft connected with said lever, whereby by operating said lever said spindles may be simultaneously raised or lowered, substantially as described.

EDWARD CHRISTOPHER BLACKSTONE.
RICHARD EDWARD WATTS.

Witnesses:
JOHN E. BOUSFIELD,
C. G. REDFERN.